(12) United States Patent
Axell et al.

(10) Patent No.: US 9,420,018 B2
(45) Date of Patent: *Aug. 16, 2016

(54) END-TO-END ADDRESS TRANSFER

(71) Applicant: Telefonaktiebolaget LM Ericsson (publ), Stockholm (SE)

(72) Inventors: Jorgen Axell, Danderyd (SE); Andreas Anulf, Lindingö (SE); Hans Nordin, Tullinge (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/075,311

(22) Filed: Nov. 8, 2013

(65) Prior Publication Data
US 2014/0098716 A1    Apr. 10, 2014

Related U.S. Application Data

(63) Continuation of application No. 13/062,546, filed as application No. PCT/EP2008/061785 on Sep. 5, 2008, now Pat. No. 8,606,932.

(51) Int. Cl.
| | |
|---|---|
| *G06F 15/16* | (2006.01) |
| *H04L 29/06* | (2006.01) |
| *H04L 29/12* | (2006.01) |

(52) U.S. Cl.
CPC ...... *H04L 65/4053* (2013.01); *H04L 29/12594* (2013.01); *H04L 61/301* (2013.01); *H04L 65/1006* (2013.01); *H04L 65/1069* (2013.01); *H04L 61/3085* (2013.01); *H04L 69/22* (2013.01)

(58) Field of Classification Search
CPC ............ H04L 65/4053; H04L 65/1069; H04L 65/1006; H04L 61/301; H04L 61/3085; H04L 69/22; H04L 29/12594
USPC .......................... 709/206, 227, 236, 238–244
See application file for complete search history.

(56) References Cited

U.S. PATENT DOCUMENTS

| | | | | |
|---|---|---|---|---|
| 6,678,735 | B1 * | 1/2004 | Orton et al. ..................... | 709/230 |
| 6,680,943 | B1 * | 1/2004 | Gibson ................... | H04L 29/06 370/392 |
| 7,133,923 | B2 * | 11/2006 | MeLampy et al. ............. | 709/231 |
| 7,254,643 | B1 * | 8/2007 | Peters et al. ................... | 709/246 |
| 7,266,591 | B1 * | 9/2007 | Johnston ........................ | 709/219 |

(Continued)

FOREIGN PATENT DOCUMENTS

WO    2008080334 A1    7/2008

OTHER PUBLICATIONS

International Search Report issued in corresponding International application No. PCT/EP2008/061785, date of mailing Sep. 8, 2009.

(Continued)

*Primary Examiner* — Kevin Mew
(74) *Attorney, Agent, or Firm* — Patent Portfolio Builders PLLC

(57) ABSTRACT

According to a first aspect of the present invention there is provided a method of facilitating the end-to-end transfer of a URI between a plurality of SIP entities. The method comprising generating a SIP message and including the URI to be transferred in a Contact header of the message and including in the Contact header a parameter indicating to a back-to-back user agent that this URI is not to be changed or replaced.

20 Claims, 6 Drawing Sheets

(56) References Cited

U.S. PATENT DOCUMENTS

| | | | |
|---|---|---|---|
| 7,349,402 B2 | 3/2008 | Isomäki et al. | |
| 7,412,541 B1* | 8/2008 | Stadler et al. | 709/247 |
| 7,446,812 B2* | 11/2008 | Ando et al. | 348/362 |
| 7,484,240 B2* | 1/2009 | Faccin | H04L 29/06027 380/247 |
| 7,555,555 B2* | 6/2009 | Park et al. | 709/227 |
| 7,864,734 B2 | 1/2011 | Isomäki et al. | |
| 7,877,487 B2* | 1/2011 | Cai | H04W 8/20 709/227 |
| 7,933,261 B2* | 4/2011 | Kato | 370/352 |
| 7,984,159 B2* | 7/2011 | Tanizawa et al. | 709/227 |
| 7,990,960 B2* | 8/2011 | Bakker | H04L 63/0421 370/352 |
| 8,028,074 B2* | 9/2011 | Allen | 709/227 |
| 8,055,778 B2* | 11/2011 | Richardson | H04L 65/1073 370/238 |
| 8,135,845 B2* | 3/2012 | Lee et al. | 709/227 |
| 8,144,695 B2* | 3/2012 | Bakker et al. | 370/352 |
| 8,230,109 B2 | 7/2012 | Van Elburg et al. | |
| 8,271,667 B2* | 9/2012 | Hoshino | H04L 29/06027 370/260 |
| 8,401,154 B2* | 3/2013 | Boni | H04M 11/04 370/352 |
| 8,924,567 B1* | 12/2014 | Simoes et al. | 709/227 |
| 2003/0108002 A1* | 6/2003 | Chaney et al. | 370/261 |
| 2003/0179762 A1 | 9/2003 | Isomäki et al. | |
| 2004/0037407 A1* | 2/2004 | Gourraud et al. | 379/202.01 |
| 2004/0132452 A1* | 7/2004 | Lee | H04W 80/00 455/445 |
| 2004/0249951 A1* | 12/2004 | Grabelsky | H04L 29/06 709/227 |
| 2005/0226174 A1* | 10/2005 | Kiss | 370/282 |
| 2006/0003734 A1* | 1/2006 | Vallinen et al. | 455/406 |
| 2006/0047840 A1* | 3/2006 | Postmus | 709/230 |
| 2006/0183491 A1* | 8/2006 | Gundu et al. | 455/518 |
| 2006/0239247 A1* | 10/2006 | Postmus | 370/352 |
| 2006/0253538 A1* | 11/2006 | Jung et al. | 709/206 |
| 2007/0043872 A1* | 2/2007 | Pattan | H04L 29/06027 709/227 |
| 2007/0083658 A1* | 4/2007 | Hanna | H04L 29/06027 709/227 |
| 2007/0129051 A1* | 6/2007 | Sung | H04W 76/005 455/403 |
| 2007/0133517 A1* | 6/2007 | Miller | H04L 65/1069 370/352 |
| 2007/0213039 A1* | 9/2007 | Skog | 455/414.3 |
| 2008/0068995 A1* | 3/2008 | Skog | 370/230.1 |
| 2008/0120425 A1* | 5/2008 | Beyer et al. | 709/230 |
| 2008/0162637 A1 | 7/2008 | Adamczyk et al. | |
| 2008/0171564 A1 | 7/2008 | Tanizawa et al. | |
| 2008/0235381 A1 | 9/2008 | Tanizawa et al. | |
| 2009/0003321 A1* | 1/2009 | Bian | H04M 3/42382 370/352 |
| 2009/0028089 A1 | 1/2009 | Isomäki et al. | |
| 2009/0052436 A1* | 2/2009 | Kotera | H04L 12/66 370/352 |
| 2009/0185523 A1* | 7/2009 | Allen et al. | 370/328 |
| 2009/0187919 A1* | 7/2009 | Maes | 719/313 |
| 2009/0191869 A1* | 7/2009 | Siegel et al. | 455/435.1 |
| 2009/0204681 A1* | 8/2009 | Sun | 709/206 |
| 2009/0225965 A1* | 9/2009 | Migishima | 379/142.04 |
| 2011/0119340 A1* | 5/2011 | Van Elburg et al. | 709/206 |

OTHER PUBLICATIONS

Rosenberg, J., et al., "SIP: Session Initiation Protocol," SIP Working Group, Jun. 1, 2002, pp. 1-269, XP015009039.

Camarillo Ericsson A "Ad-Hoc Conferencing in the Session Initiation Protocol (SIP) draft-camarillo-sipping-adhoc-conferencing-00.txt," IETF Standard-Working-Draft, Internet Engineering Task Force, IETF, Mar. 27, 2004, XP015011475, ISSN: 0000-0004.

Marjou, X., "Best Current Practices for a Session Initiation Protocol (SIP) Transparent Back-To-Back User-Agent (B2BUA); draft-marjou-sipping-b2bua-01.txt," IETF Standard-Working-Draft, Internet Engineering Task Force, IETF, Ch. No. 1, Jul. 9, 2007, XP015051976; ISSN: 0000-004.

Communication pursuant to Article 94(3) EPC in corresponding European Patent Application No. 08 803 754.4 dated Jul. 11, 2014.

Elias Baixas; "SEAS Module"; [downloaded from the internet at http://www.kamailio.org/docs/modules/1.2.x/seas.html on Nov. 2, 2011]; XP007917128; Jan. 1, 2006; pp. 1-36.

Office Action in corresponding Chinese Application No. 200880131042.1 issued May 10, 2013.

* cited by examiner

END-TO-END ADDRESS TRANSFER

FIELD OF THE INVENTION

The present invention relates to the end-to-end transfer of an address and in particular to the transfer of Uniform Resource Identifiers (URIs) in a communication network using Session Initiation Protocol (SIP) messages.

BACKGROUND

IP Multimedia Subsystem (IMS) is the technology defined by the Third Generation Partnership Project (3G) to provide IP Multimedia services over mobile communication networks. IMS provides key features to enrich the end-user person-to-person communication experience through the use of standardised IMS Service Enablers, which facilitate new rich person-to-person (client-to-client) communication. An IMS network is able to connect to both PSTN/ISDN (Public Switched Telephone Network/Integrated Services Digital Network) as well as the Internet.

IMS provides a dynamic combination of voice, video, messaging, data, etc. within the same session. By growing the number of basic applications and the media which it is possible to combine, the number of services offered to the end users will grow, and the inter-personal communication experience will be enriched. This will lead to a new generation of personalised, rich multimedia communication services, including so-called "combinational IP Multimedia" services.

The IMS makes use of the Session Initiation Protocol (SIP) to set up and control calls or sessions between user terminals (or user terminals and application servers). The Session Initiation Protocol is a text-based protocol specified by the Internet Engineering Task Force (IETF) in RFC 3261, similar to Hypertext Transfer Protocol (HTTP) and Simple Mail Transfer Protocol (SMTP), for initiating interactive communication sessions between users. Such sessions include voice, video, chat, interactive games, and virtual reality. Extensions to SIP are also specified in several other IETF specifications.

SIP makes it possible for a calling party to establish a packet switched session to a called party (using so-called SIP User Agents (UA) installed in the User Equipment (UE)) even though the calling party does not know the current IP address of the called party prior to initiating the call. The Session Description Protocol (SDP), carried by SIP signalling, is used to describe and negotiate the media components of the session. Whilst SIP was created as a user-to-user protocol, IMS allows operators and service providers to control user access to services and to charge users accordingly.

FIG. 1 of the accompanying drawings illustrates schematically how the IMS fits into the mobile network architecture in the case of a GPRS/PS access network (IMS can of course operate over other access networks). Call/Session Control Functions (CSCFs) operate as SIP proxies within the IMS. The 3G architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

SIP offers flexibility in how different services associated with a session may be invoked and there are services where the direct contact address of a particular user or service may need to be transferred by a second user or service to a third party. One common way of doing this is by using the URI as received in the Contact header of a SIP message. The Contact header is normally used to provide for direct communication between SIP entities such that subsequent requests will be directed to the URI within the Contact header. However, in some networks the Contact header of a SIP message may be mapped to that of, for example, a Back-to-Back User Agent (B2BUA) such as a Session Border Controller (SBC) or some Application Servers, such that the direct contact address of the user or service does not reach the recipient SIP entity. Messages intended for the user or service must then pass through the same nodes that performed the original mapping, as these nodes are required to perform inverse mapping of the address. Such inverse mapping is only possible if the message is sent within a dialog and the message follows the same path as the original message.

An example of a service that may require an address to be transferred to a third party is that of a conference. FIG. 2 illustrates a simplified signalling flow of a scenario wherein a first SIP user agent (within UE-A) creates an 'ad hoc' conference and subsequently requests that a second SIP user agent (within UE-B) dial into that conference. The steps performed are as follows:

R1. UE-A sends an INVITE request to a SIP server (conference server or conference factory) via an SBC and an Application Server (AS). The Request-URI of the INVITE is set to the URI of the SIP server acting as a conference factory (conf-factory-URI).

R2. The SIP server accepts the INVITE, creates a focus for the conference and sends a response to UE-A with the Contact header set to the URI of the conference focus (conf-URI) and with the addition of the "isfocus" feature tag, as defined in RFC 4579.

R3. The AS in this example acts as a B2BUA, maps the Contact header to the URI of the AS (AS-URI) also containing the "isfocus" feature tag, and forwards the response to the SBC.

R4. The SBC also acts as a B2BUA and maps the Contact header to its URI (SBC-URI), again including the "isfocus" feature tag, and forwards the response to UE-A.

R5. UE-A requests that UE-B join the conference using the REFER request. According to 3GPP TS 24.147, the Refer-To header is set to the conference URI learnt during conference establishment that, due to address mapping at the SBC, is the SBC-URI.

R6. The REFER is routed using normal SIP routing to UE-B.

R7. In attempting to join the conference, UE-B sends an INVITE request using the URI in the Refer-To header as the Request URI. As described above the Refer-To header is set to the URI of the SBC, such that the INVITE sent by UE-B is routed to the SBC and not to the conference focus.

The problem with existing technology is that a third party i.e. UE-B, will not be able to join the session due to mapping of the direct contact address of the user or service.

SUMMARY

It is an object of the present invention to overcome or at least mitigate the problem noted above.

According to a first aspect of the present invention there is provided a method of facilitating the end-to-end transfer of a URI between a plurality of SIP entities. The method comprises generating a SIP message and including the URI to be transferred in a Contact header of the message and including in the Contact header a parameter indicating to a back-to-back user agent that this URI is not to be changed or replaced.

According to a second aspect of the present invention there is provided a method of transferring a URI from a first SIP entity to a second SIP entity, through any number of intermediate back-to-back user agent. The method comprises, at the first SIP entity, generating a SIP message and including the URI to be transferred in a Contact header and including in the Contact header a parameter indicating to a back-to-back user agent that this URI is not to be changed or replaced, and sending the SIP message to the second SIP entity. At any intermediate back-to-back user agent, the SIP message is received from the first SIP entity. The entity identifies the presence of a parameter indicating that this address is not to be changed or replaced, within the Contact header of the SIP message. The SIP entity forwards the SIP message to the second SIP entity with its Contact header unchanged.

According to a third aspect of the present invention there is provided an apparatus configured to operate as a SIP entity. The apparatus comprises a processor for generating a SIP message, for including a URI to be transferred in a Contact header and for including in the Contact header a parameter indicating to a back-to-back user agent that this URI is not to be changed or replaced. The apparatus further comprises a transmitter for sending this SIP message to another SIP entity. The apparatus may comprise a SIP server and preferably a SIP conferencing server.

According to a fourth aspect of the present invention there is provided an apparatus configured to operate as a back-to-back user agent. The apparatus comprises a receiver for receiving a SIP message from a first SIP entity, a processor for checking a Contact header of the SIP message for a parameter indicating that the URI in the Contact header is not to be changed or replaced, and, if the parameter is present, for ensuring that a URI within the Contact header is not changed or replaced, and a transmitter for sending the SIP message to a second SIP entity.

According to a fifth aspect of the present invention there is provided a method of facilitating the end-to-end transfer of a URI between a plurality of SIP entities. The method comprises generating a SIP message and including the URI to be transferred in both a Contact header of the message and in a persistent header of the message, wherein a URI within the persistent header is not to be changed or replaced by a back-to-back user agent.

According to a sixth aspect of the present invention there is provided a method of transferring a URI from a first SIP entity to a second SIP entity, through any number of intermediate back-to-back user agents. The method comprises, at the first SIP entity, generating a SIP message and including the URI to be transferred in both a Contact header of the message and in a persistent header of the message. In this way, a URI within the persistent header is not to be changed or replaced by a back-to-back user agent. The SIP message is sent to the second SIP entity. At any intermediate back-to-back user agent, the SIP message is received from the first SIP entity, and forwarded to the second SIP entity with its persistent header unchanged.

According to a seventh aspect of the present invention there is provided an apparatus configured to operate as a SIP entity. The apparatus comprises a processor for generating a SIP message and including the URI to be transferred in both a Contact header of the message and in a persistent header of the message. The apparatus further comprises a transmitter for sending this message to another SIP entity. The apparatus may comprise a SIP server and preferably a SIP conferencing server.

According to an eighth aspect of the present invention there is provided an apparatus configured to operate as a back-to-back user agent. The apparatus comprises a receiver for receiving a SIP message from a first SIP entity, a processor for ensuring that a URI within a persistent header of the message is not changed or replaced, and a transmitter for sending the SIP message to a second SIP entity.

According to a ninth aspect of the present invention there is provided an apparatus configured to operate as a SIP entity. The apparatus comprises a receiver for receiving a first SIP message, a processor for checking the first SIP message for a persistent header and, if a URI is present within the persistent header, generating a second SIP message including the URI, and a transmitter for sending the second SIP message to another SIP entity.

According to a tenth aspect of the present invention there is provided a method of facilitating the end-to-end transfer of a URI between a plurality of SIP entities. The method comprises generating a SIP message and including the URI to be transferred in both a Contact header of the message and in the message body, wherein the message body is not to be changed or replaced by a back-to-back user agent.

According to an eleventh aspect of the present invention there is provided a method of transferring a URI from a first SIP entity to a second SIP entity, through any number of intermediate back-to-back user agents. The method comprises, at the first SIP entity, generating a SIP message and including the URI to be transferred in both a Contact header of the message and in the message body, wherein the message body is not to be changed or replaced by a back-to-back user agent, and sending the SIP message to the second SIP entity. At any intermediate back-to-back user agent, the SIP message is received from the first SIP entity, and forwarded to the second SIP entity with its message body unchanged.

According to a twelfth aspect of the present invention there is provided an apparatus configured to operate as a SIP entity. The apparatus comprises a processor for including a URI in the message body of a SIP message, and a transmitter for sending the SIP message to another SIP entity. The apparatus may comprise a SIP server and preferably a SIP conferencing server.

According to a thirteenth aspect of the present invention there is provided an apparatus configured to operate as a SIP entity. The apparatus comprises a receiver for receiving a first SIP message, a processor for processing the first SIP message and, if a URI is present in the message body, generating a second SIP message including the URI, and a transmitter for sending the second SIP message to another SIP entity.

According to a fourteenth aspect of the present invention there is provided a method of establishing a conference call between two or more SIP users. The method comprises first sending a SIP INVITE from a first of said SIP users to a SIP conferencing server. A method of transferring a URI from a first SIP entity to a second SIP entity according to one of the above aspects is employed in order to deliver a conf-URI from the SIP conferencing server to the first SIP user. A SIP REFER is sent from said first user to the or each other user, the REFER including said conf URI.

DETAILED DESCRIPTION

As has already been discussed, using existing technologies it is not always possible for the address of a user to be transferred end-to-end, in particular when transferring through a Back-to-back User Agent (B2BUA) such as a Session Border Controller (SBC) or some Application Servers (AS) which may invoke topology and/or identity hiding that will cause the Contact header of a Session Initiation Protocol (SIP) message to be modified.

Figure 3:
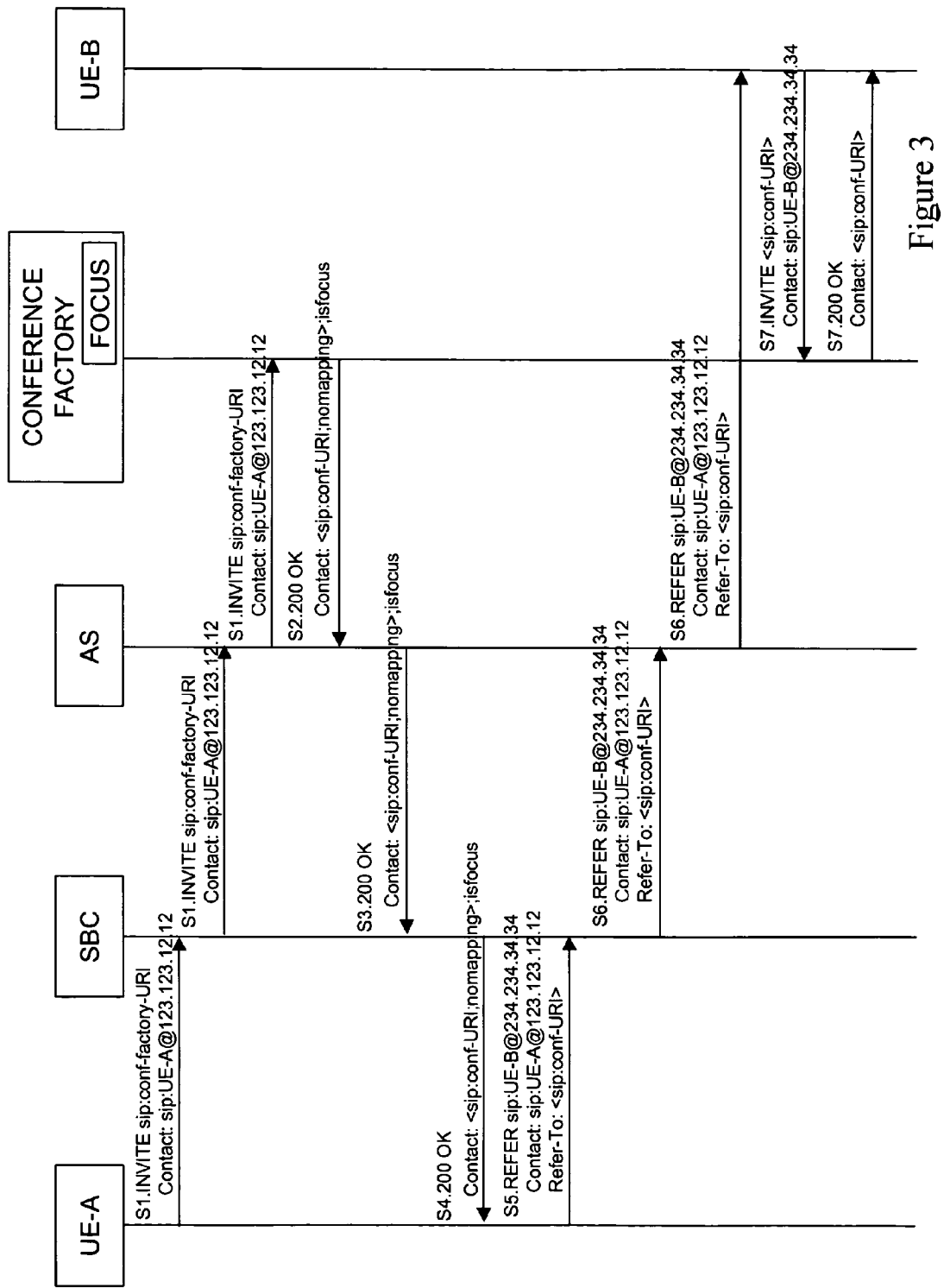
FIG. 3 illustrates an example signalling flow of the scenario of FIG. 2 implementing a "nomapping" URI parameter.

In order to overcome this problem it is proposed here to introduce a new URI parameter, "nomapping". URI parameters are added after the host:port component of a URI, separated by semi-colons (e.g. sip:conf-URI;nomapping, as shown in FIG. 3), and affect a request constructed from the URI. By adding this parameter to a URI it would inform a B2BUA that this URI should not be mapped by the B2BUA. The B2BUA would then need to act like a SIP Proxy server, forwarding the SIP message and adding its address to the Record-route header instead of mapping it into the Contact header field.

Figure 1:
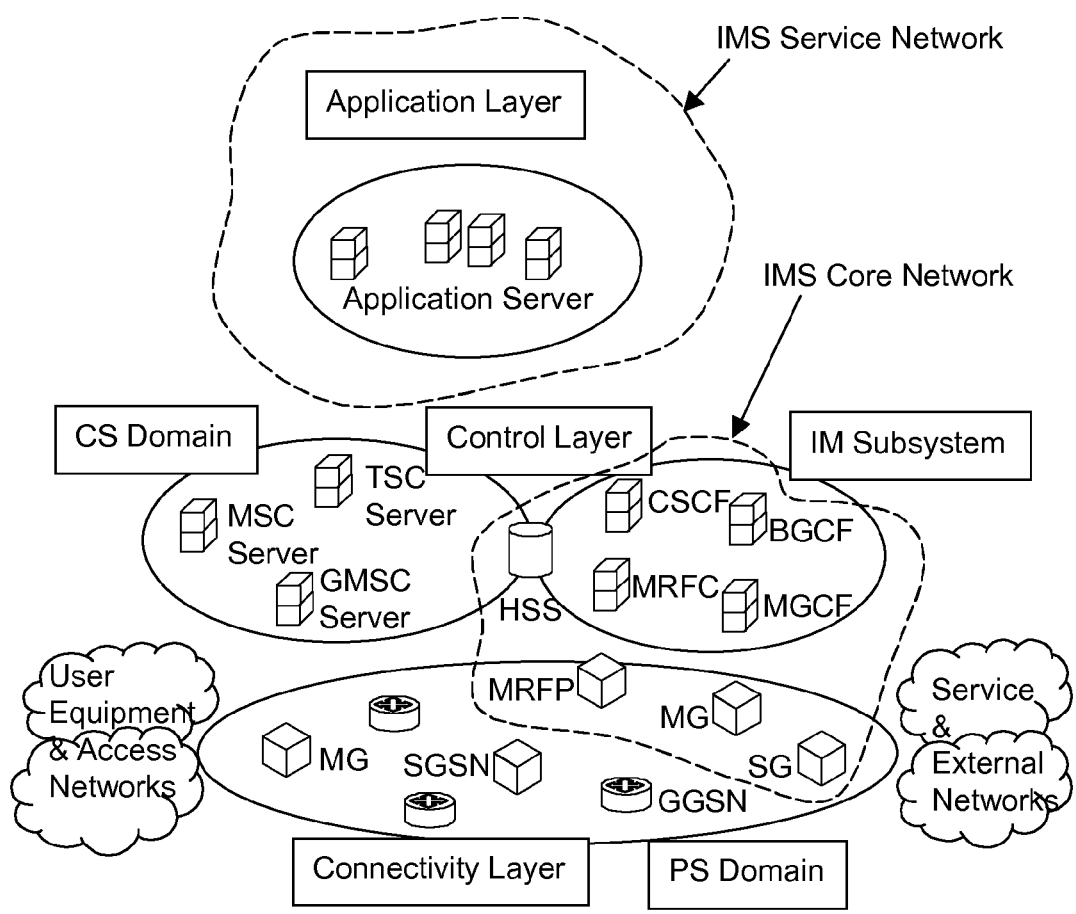
FIG. 1 illustrates schematically the integration of an IP Multimedia Subsystem into a 3G mobile communications system.
Figure 2:
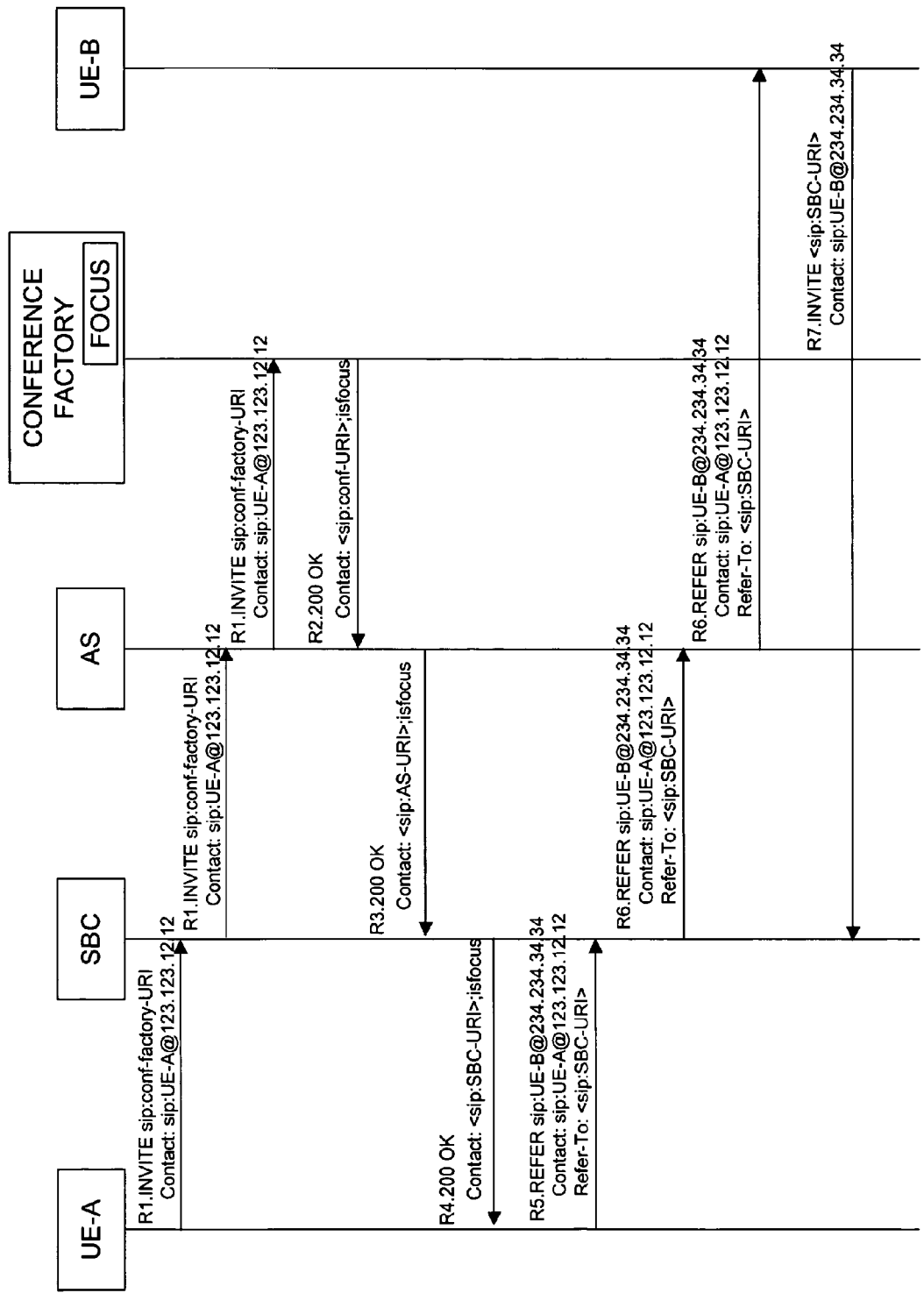
FIG. 2 illustrates an example signalling flow of a known scenario wherein a first user creates an 'ad hoc' conference and subsequently requests that a second user dial into that conference.

FIG. 3 illustrates a simplified signalling flow of the scenario of FIG. 2 implementing a "nomapping" URI parameter. The steps performed are as follows:

S1. UE-A sends an INVITE request to a SIP server (conference factory), via an SBC and an AS. The Request-URI of the INVITE is set to the URI of the SIP server acting as a conference factory (conf-factory-URI).

S2. The SIP server accepts the INVITE, creates a focus for the conference and sends a response to UE-A with the Contact header set to the URI of the conference focus (conf-URI) and with the addition of the "nomapping" URI parameter and the "isfocus" feature tag.

S3. The AS is informed by the presence of the "nomapping" URI parameter that, although it is acting as a B2BUA, the Contact header of the response should not be mapped. The AS then acts like a SIP proxy, forwarding the response to the SBC with the Contact header unchanged and adding its address as a Record-route header.

S4. Similarly, the presence of the "nomapping" URI parameter prevents the SBC from mapping the Contact header to its URI (SBC-URI). The SBC then also acts like a SIP proxy, forwarding the response to UE-A with the Contact header unchanged and adding its address as a Record-route header.

S5. UE-A requests that UE-B join the conference using the REFER request. The Refer-To header is set to the conference URI learned during conference establishment that, due to the presence of the "nomapping" URI parameter, is the conference focus URI (conf-URI).

S6. The REFER is routed using normal SIP routing to UE-B.

S7. UE-B then attempts to join the conference, sending an INVITE request using the URI in the Refer-To header as the Request URI. As described above, the Refer-To header is set to the URI of the conference focus, such that the INVITE is correctly routed to the conference focus.

The URI in the Contact header can be either a SIP URI or a SIPS URI. The use of a SIPS URI allows resources to specify that they should be reached securely, and in particular that mutual TLS authentication should be employed.

As an alternative solution to the problem it is proposed to define a new SIP header, "P-Unique-Address". The "P-Unique-Address" header would contain a URI that should not be mapped by a B2BUA. A SIP entity such as a SIP UA or SIP server may then use this header to ensure that its address can be transferred to the recipient of a SIP message i.e. the end-point SIP entity, without being mapped by intermediate entities, such as a B2BUA. The recipient SIP entity can check for this header and use the address give in the field value. When using a new "P-Unique-Address" SIP header, the URI in the header can be either a SIP URI or a SIPS URI. It could also be a Tel URI.

Figure 4:
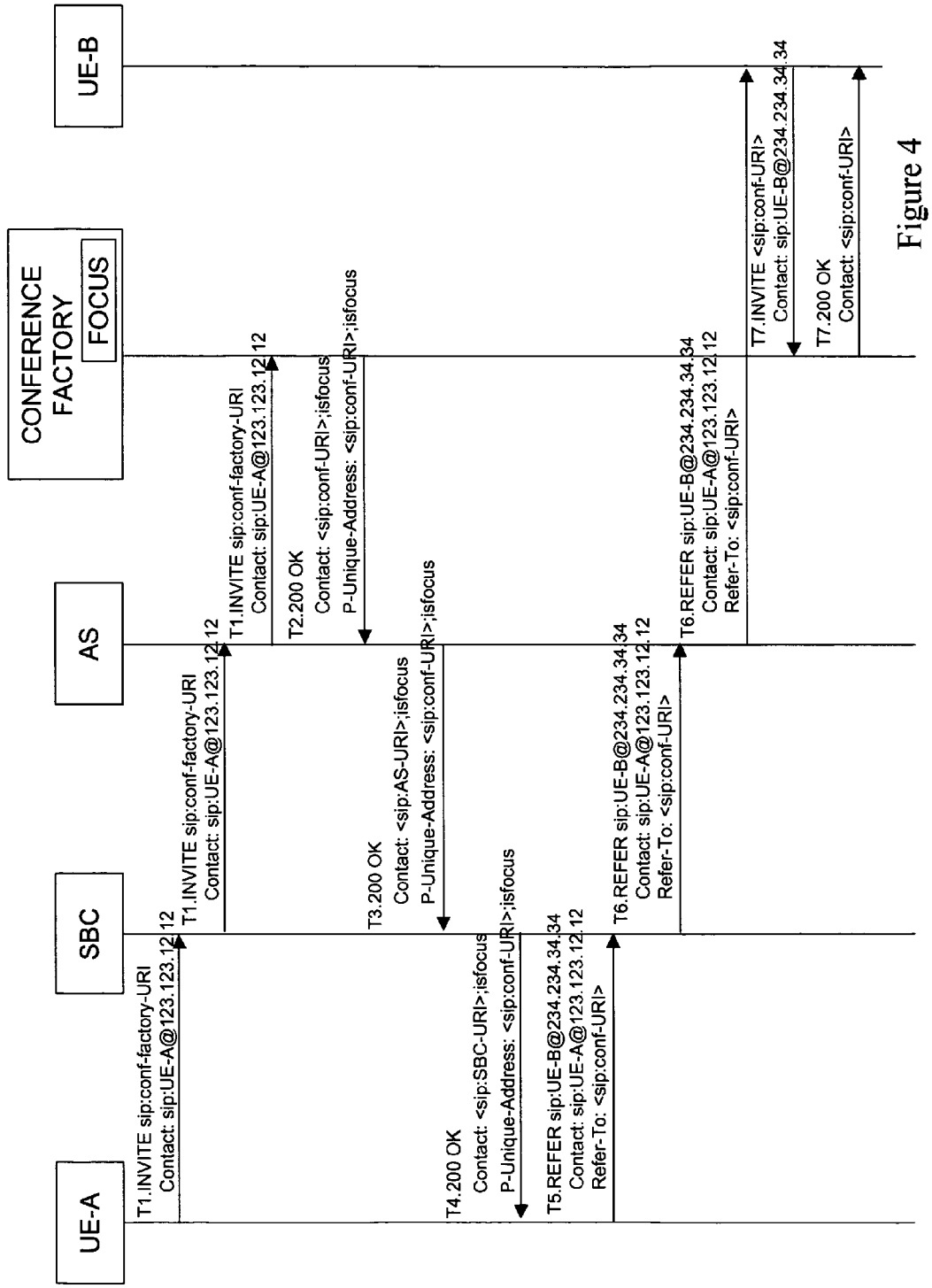
FIG. 4 illustrates a simplified signalling flow of the scenario of FIG. 2 implementing a "P-Unique-Address" header.

FIG. 4 illustrates a simplified signalling flow of the scenario of FIG. 2 implementing a "P-Unique-Address" SIP header. The steps performed are as follows:

T1. UE-A sends an INVITE request to a SIP server (conference factory) via an SBC and an AS. The Request-URI of the INVITE is set to the URI of the SIP server acting as a conference factory (conf-factory-URI).

T2. The SIP server accepts the INVITE, creates a focus for the conference, sends a response to UE-A with the Contact header set to the URI of the conference focus (conf-URI), and adds the "isfocus" feature tag. In addition, the conference factory adds the "P-Unique-Address" header into the response and sets it to the conference focus URI (conf-URI) with the "isfocus" feature tag.

T3. The AS, acting as a B2BUA, maps the Contact header to the URI of the AS (AS-URI) also containing the "isfocus" feature tag, and forwards the response to the SBC. The AS leaves the URI in the "P-Unique-Address" header unchanged.

T4. The SBC also acts as a B2BUA and maps the Contact header to its URI (SBC-URI), again including the "isfocus" feature tag, and forwards the response to UE-A. The SBC also leaves the URI in the "P-Unique-Address" header unchanged.

T5. UE-A requests that UE-B join the conference using the REFER request. UE-A checks for the "P-Unique-Address" header and uses the URI in the field value to set the Refer-To header to the conference focus URI (conf-URI).

T6. The REFER is routed using normal SIP routing to UE-B.

T7. UE-B then attempts to join the conference, sending an INVITE request using the URI in the Refer-To header, as the Request URI. As described above the Refer-To header is set to the URI of the conference focus, such that the INVITE is correctly routed to the conference focus.

As a third alternative solution to the problem, a URI may be included in the body of a SIP message. Whilst the message body carried by a SIP message is usually a session description (using Session Description Protocol (SDP)) it can carry any text-based information. Usually, all information required to route a SIP message is contained within the start line and the headers such that a proxy or B2BUA does not need to examine or change the message body. As a result, the message body is transmitted end-to-end without modification. The end recipient of the message then processes the SIP message including the body, and can determine that the body contains a URI to be used for redirection. The body may or may not be encrypted. As with the use of a new "P-Unique-Address" SIP header, when placing a URI in the body of a SIP message the URI can be either a SIP or a SIPS URI, or a Tel URI.

Figure 5:
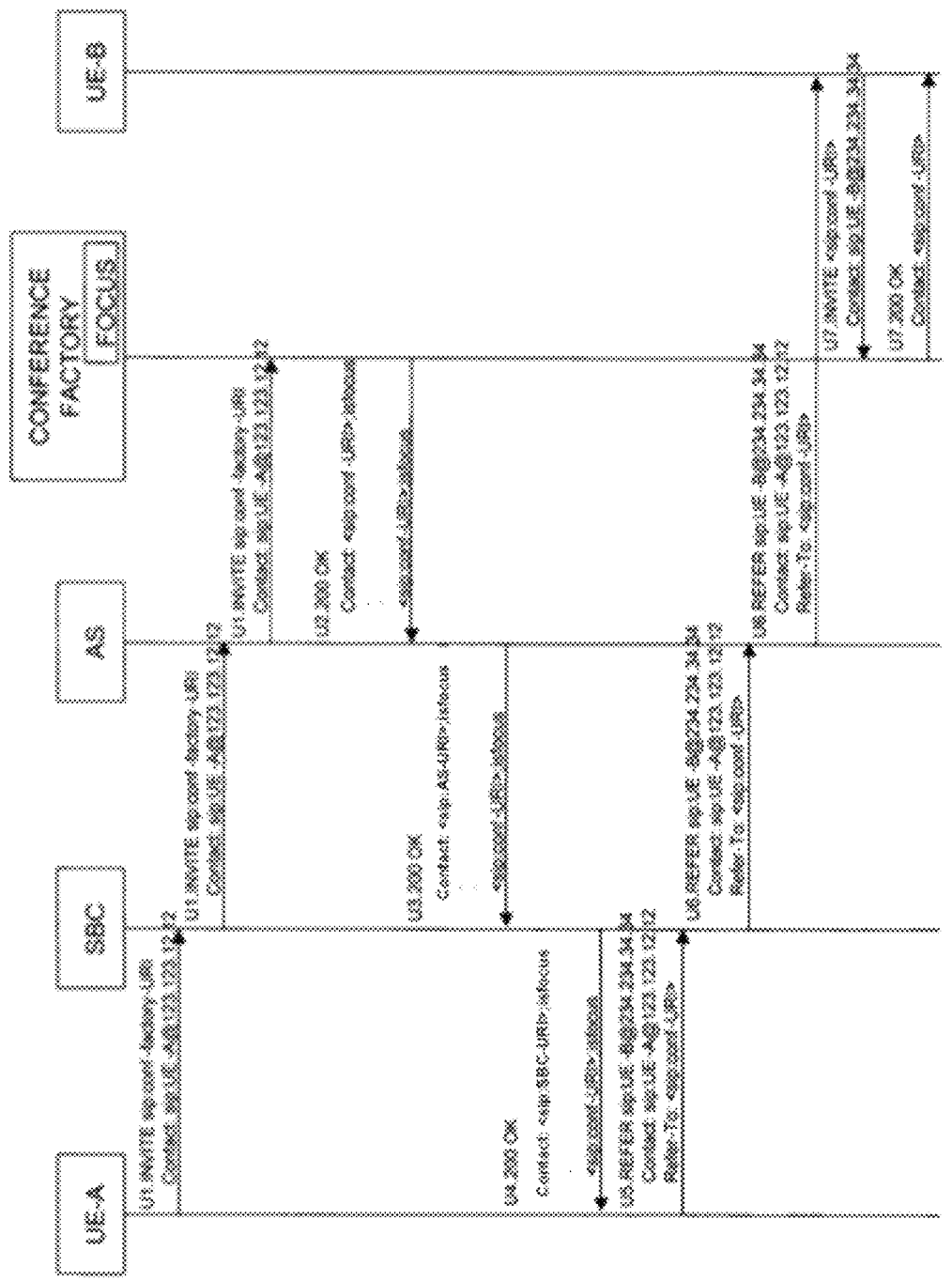
FIG. 5 an example signalling flow of the scenario of FIG. 2 implementing a URI contained in the SIP message body.

Referring again to the scenario illustrated in FIG. 2, FIG. 5 illustrates a simplified signalling flow implementing a URI contained in the SIP message body. The steps performed are as follows:

U1. UE-A sends an INVITE request to a SIP server (conference factory) via an SBC and an AS. The Request-URI of the INVITE is set to the URI of the SIP server acting as a conference factory (conf-factory-URI).

U2. The conference factory accepts the INVITE, creates a focus for the conference and sends a response to UE-A with the Contact header set to the URI of the conference focus (conf-URI) and with the addition of the "isfocus" feature tag. In addition, the conference factory inserts the URI of the conference focus into the body of the response.

U3. The AS, acting as a B2BUA, maps the Contact header to the URI of the AS (AS-URI) also containing the "isfocus" feature tag and forwards the response to the SBC. The AS leaves the body of the message, and therefore the URI of the conference focus, unchanged.

U4. The SBC applies identity/topology hiding and maps the Contact header to its URI (SBC-URI), again including the "isfocus" feature tag, and forwards the response to UE-A. The SBC also leaves the body of the message, and therefore the URI of the conference focus, unchanged.

U5. As part of processing the response, UE-A identifies that the message body contains a URI that can be used to redirect messages towards the conference factory. When UE-A requests that UE-B join the conference using the REFER request, the Refer-To header is set to the URI found in the message body (conf-URI).

U6. The REFER is routed using normal SIP routing to UE-B.

U7. UE-B then attempts to join the conference, sending an INVITE request using the URI in the Refer-To header, as the Request URI. As described above the Refer-To header is set to the URI of the conference focus, such that the INVITE is correctly routed to the conference focus.

The mechanisms described above enable a URI to be transferred transparently through a network. This provides the advantage that a user can send this URI to another user, thus enabling this other user to use the service identified by the URI. Conference calls are an example of such a service, where the URI identifies a particular conference session. Another example of such a service is a gaming service where the URI identifies a particular game session. Many similar examples, where users need access to a service identified by a specific identity, are possible.

Figure 6:
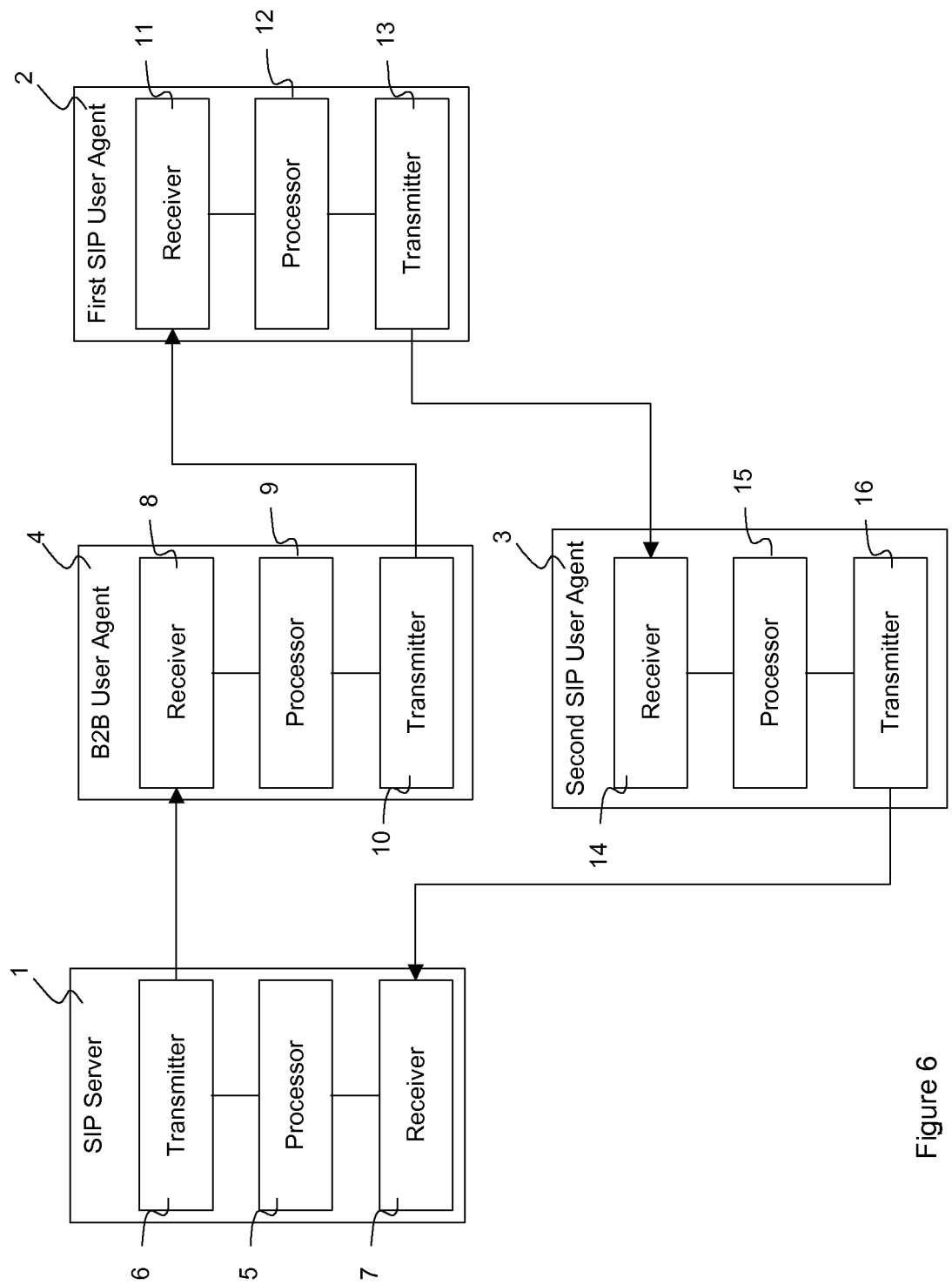
FIG. 6 illustrates schematically an example of a SIP architecture.

FIG. 6 illustrates schematically an example of a SIP architecture in which the above-described scenarios can occur. The architecture includes three SIP entities; a SIP Server 1, a first SIP User Agent 2 and a second SIP User Agent 3, and a Back-to-Back User Agent 4.

The SIP Server 1 is suitable for facilitating a service, such as a conference server or conference factory as described above, and comprises a processor 5, a transmitter 6 and a receiver 7. The processor 5 is suitable for implementing any or all of the solutions described above, by:
1. creating a SIP message including a Contact header and inserting its URI, along with the 'nomapping' parameter into the Contact header; or
2. creating a SIP message including a P-Unique-Address header and inserting its URI into this header; or
3. creating a SIP message and inserting its URI into the message body.

This SIP message is then sent to the first SIP User Agent 2 using the transmitter 6.

The SIP message sent from SIP Server 1 to SIP User Agent 2 has to traverse the Back-to-Back User Agent 4. Back-to-Back User Agent 4 is suitable for identity and/or topology hiding as described above, and comprises a receiver 8, a processor 9 and a transmitter 10. The receiver 8 receives the SIP message sent from SIP Server 1. The processor 9 then processes this message as required in order to implement any or all of the solutions described above, by:
1. checking the Contact header of a SIP message for the 'nomapping' parameter and if the parameter is present, processing the SIP message leaving the URI in the Contact header unchanged; or
2. processing a SIP message leaving the URI in the P-Unique-Address header unchanged; or
3. processing a SIP message leaving the URI in the message body unchanged.

The SIP message is then sent to the first SIP User Agent 2 using the transmitter 10.

The first SIP User Agent 2 is suitable for sending the URI of a user or service to a third party as described above, and comprises a receiver 11, a processor 12 and a transmitter 13. The receiver 11 receives the SIP message sent from SIP Server 1, through Back-to-Back User Agent 4. The processor 12 then processes this message as required in order to implement any or all of the solutions described above, by:
1. creating a second SIP message including the URI found in the Contact header; or
2. checking the SIP message for a P-Unique-Address header containing a URI and, if the P-Unique-Address header is present, creating a second SIP message including the URI; or
3. checking the body of the SIP message for a URI and, if the message body contains a URI, creating a second SIP message including the URI.

The second SIP message is then sent to the second SIP User Agent 3 using the transmitter 13.

The second SIP User Agent 3 is suitable for establishing a session with a SIP user or service using a URI sent to it by a third party as described above, and comprises a receiver 14, a processor 15 and a transmitter 16. The receiver 14 receives the second SIP message, sent from the first SIP User Agent 2. The processor 15 then processes this message as required in order to establish the session. A third SIP message is then sent to SIP Server 1 using transmitter 16.

It will be appreciated by the person of skill in the art that various modifications may be made to the above described embodiments without departing from the scope of the present invention.

The invention claimed is:

1. Apparatus configured to operate as a SIP entity, comprising:
   a receiver for receiving a first SIP message;
   a processor for processing the first SIP message and including a same URI in the message header and message body of a second SIP message in response to receipt of the first SIP message, and
   a transmitter for sending the second SIP message to another SIP entity,
   wherein the another SIP entity is a SIP Back-to-Back User Agent or a SIP Application Server.

2. Apparatus configured to operate as a SIP entity, comprising:
   a receiver for receiving a first SIP message;

a processor for processing the first SIP message and, if a URI is present in the message body, generating a second SIP message including the URI; and a transmitter for sending the second SIP message to another SIP entity, wherein the processor generates the second SIP message including the URI in a header of the second SIP message.

3. The apparatus according to claim 1, wherein the message body of the second SIP message comprises text-based information, the text-based information comprising the URI.

4. The apparatus according to claim 1, wherein the URI identifies a service.

5. The apparatus according to claim 4, wherein the URI identifies the service by identifying a session of the service.

6. The apparatus according to claim 5, wherein the session of the service comprises a conference session.

7. The apparatus according to claim 5, wherein the session of the service comprises a game session.

8. The apparatus according to claim 2, wherein the URI identifies a service.

9. The apparatus according to claim 8, wherein the URI identifies the service by identifying a session of the service.

10. The apparatus according to claim 9, wherein the session of the service comprises a conference session.

11. The apparatus according to claim 9, wherein the session of the service comprises a game session.

12. A system, comprising:
    a first apparatus configured to operate as a SIP entity, including:
        a receiver for receiving a first SIP message;
        a processor for processing the first SIP message and including a same URI in the message header and message body of a second SIP message in response to receipt of the first SIP message, and
        a transmitter for sending the second SIP message to another SIP entity,
    wherein the another SIP entity is a SIP Back-to-Back User Agent or a SIP Application Server.

13. The system according to claim 12, further comprising:
    a second apparatus configured to operate as a SIP entity, including:
        a receiver for receiving the second SIP message;
        a processor for processing the second SIP message and, if the URI is present in the message body of the second SIP message, generating a third SIP message including the URI; and
        a transmitter for sending the third SIP message to another SIP entity.

14. The system according to claim 13, wherein the message body of the second SIP message comprises text-based information, the text-based information comprising the URI.

15. The system according to claim 13, wherein the processor of the second apparatus generates the third SIP message including the URI in a header of the third SIP message.

16. The system according to claim 13, wherein the URI identifies a service.

17. The system according to claim 16, wherein the URI identifies the service by identifying a session of the service.

18. The system according to claim 17, wherein the session of the service comprises a conference session.

19. The system according to claim 17, wherein the session of the service comprises a game session.

20. The apparatus according to claim 1, wherein the URI is included in a Contact header field of the message header.

* * * * *